United States Patent
Neef et al.

(10) Patent No.: US 10,898,841 B2
(45) Date of Patent: *Jan. 26, 2021

(54) FILTER ELEMENT, IN PARTICULAR FOR GAS FILTRATION

(71) Applicant: MANN+HUMMEL GmbH, Ludwigsburg (DE)

(72) Inventors: Pascal Neef, Leonberg (DE); Klaus Gehwolf, Mamming (DE); Thomas Sieber, Marklkofen (DE); Joachim-Paul Krieger, Reisbach (DE); Werner Blossey, Benningen (DE); Philipp Hettkamp, Freiberg (DE); Gelase Mbadinga Mouanda, Bietigheim-Bissingen (DE); Stefan Walz, Freiberg (DE); Michael Heim, Charlotte, NC (US); Martin Wuebbeling, Mannheim (DE); Georg Kloeter, Korschenbroich (DE)

(73) Assignee: MANN+HUMMEL GmbH, Ludwigsburg (DE)

( * ) Notice: Subject to any disclaimer, the term of this patent is extended or adjusted under 35 U.S.C. 154(b) by 0 days.

This patent is subject to a terminal disclaimer.

(21) Appl. No.: 16/113,025

(22) Filed: Aug. 27, 2018

(65) Prior Publication Data

US 2018/0361294 A1    Dec. 20, 2018

Related U.S. Application Data

(63) Continuation of application No. PCT/EP2017/052965, filed on Feb. 10, 2017.

(30) Foreign Application Priority Data

Feb. 26, 2016  (DE) .................. 10 2016 002 246

(51) Int. Cl.
  *B01D 46/00*   (2006.01)
  *B01D 46/10*   (2006.01)
  *B01D 46/52*   (2006.01)

(52) U.S. Cl.
  CPC ..... *B01D 46/0005* (2013.01); *B01D 46/0002* (2013.01); *B01D 46/10* (2013.01);
  (Continued)

(58) Field of Classification Search
  CPC ............. B01D 46/521; B01D 2265/06; B01D 46/0005; B01D 46/10; B01D 2265/04;
  (Continued)

(56) References Cited

U.S. PATENT DOCUMENTS 5,792,229 A  *  8/1998  Sassa ................. B01D 46/0001
                                                      55/497
2002/0150806 A1   10/2002  Stenersen et al.
(Continued)

FOREIGN PATENT DOCUMENTS

DE          19816431 A1     10/1998

*Primary Examiner* — Robert Clemente
(74) *Attorney, Agent, or Firm* — James Hasselbeck

(57) ABSTRACT

A filter element has a filter medium body with a first side and an oppositely positioned second side, wherein one of the first and second sides is the inflow side of the filter medium body and the other one is the outflow side of the filter medium body. A first sealing or supporting element is arranged at the first side. A second sealing or supporting element is arranged at the second side. At least one force-transmitting adhesive bead extends between the first side and the second side, wherein the at least one adhesive bead is a force transmitting element extending between the first and second sealing or supporting elements.

16 Claims, 5 Drawing Sheets

(52) U.S. Cl.
CPC ........ *B01D 46/521* (2013.01); *B01D 2265/04* (2013.01); *B01D 2265/06* (2013.01); *B01D 2271/02* (2013.01); *B01D 2275/206* (2013.01)

(58) Field of Classification Search
CPC .......... B01D 2275/206; B01D 2271/02; B01D 46/0002
See application file for complete search history.

(56) References Cited

U.S. PATENT DOCUMENTS

| | | |
|---|---|---|
| 2003/0177745 A1 | 9/2003 | Jauw |
| 2013/0000267 A1 | 1/2013 | Merritt |
| 2015/0013294 A1 | 1/2015 | Schmid et al. |
| 2018/0361296 A1* | 12/2018 | Neef ................... B01D 46/10 |

* cited by examiner

FILTER ELEMENT, IN PARTICULAR FOR GAS FILTRATION

CROSS-REFERENCE TO RELATED APPLICATIONS

This application is a continuation application of international application No. PCT/EP2017/052965 having an international filing date of 10 Feb. 2017 and designating the United States, the international application claiming a priority date of 26 Feb. 2016 based on prior filed German patent application No. 10 2016 002 246.9, the entire contents of the aforesaid international application and the aforesaid German patent application being incorporated herein by reference.

BACKGROUND OF THE INVENTION

The invention concerns a filter element, in particular for gas filtration, for example, for an air filter, with a filter medium body comprising at least one adhesive bead extending between inflow side and outflow side at the filter medium body.

DE 10 2010 025 971 B4 discloses an air filter that is used for filtration of the intake air of internal combustion engines. The air filter comprises a filter medium body, which is embodied as a folded filter and comprises adhesive beads for separating the raw side from the clean side. The adhesive beads fill the intermediate fold space in the lateral area of the folded filter and extend between the fold tips of the folded filter lying at the raw side and the clean side.

The filter element is received in a filter housing that can be closed by a housing cover. At the inner side of the cover, a housing seal is disposed in a circumferentially extending groove and loads the filter element in the rim area at the clean side and pushes it into its seat in the receiving filter housing.

SUMMARY OF THE INVENTION

The invention has the object to embody with simple constructive measures a filter element that is stable.

This object is solved according to the invention in that a sealing or supporting element is arranged, respectively, at the inflow side and at the outflow side at the filter medium body and the adhesive bead forms a force transmitting element extending between the sealing or supporting elements. The dependent claims provide expedient further embodiments.

The filter element according to the invention is preferably used for gas filtration, for example, as air filter in the intake manifold of an internal combustion engine, preferably for a truck. However, a use of the filter element for liquid filtration is conceivable also.

The filter element comprises a filter medium body which is manufactured from a filter material and at which the filtration is taking place. At least one adhesive bead is arranged at the filter medium body, for example a glue bead, that is located at the filter medium body, for example, at or neighboring the outer side of the filter medium body, and extends between the oppositely positioned inflow and outflow sides of the filter medium body. At the inflow side as well as at the outflow side a sealing or supporting element is arranged at the filter medium body, respectively. The at least one adhesive bead forms the force transmitting part which is extending between the oppositely positioned sealing or supporting elements.

This embodiment has the advantage that the filter medium body is relieved of forces which are acting, for example, during insertion of the filter element into a receiving filter housing and placement of a housing cover onto the filter element. Upon placement of the housing cover onto the filter housing, a clamping force is usually generated which presses the filter element into its seat in the filter housing so that the filter element is seated without clearance in the filter housing and in particular leakage flows between raw side and clean side by bypassing the filter element are prevented. This clamping force can be guided through the sealing or supporting element at one side of the filter element and the at least one adhesive bead to the oppositely positioned sealing or supporting element at the filter element.

The sealing or supporting elements themselves are resting directly or by means of a further component against the filter housing or against the housing cover so that a force transmission between housing cover, sealing or supporting element resting against the housing cover, adhesive bead, sealing or supporting element resting against the filter housing, and filter housing is ensured. In this way, the filter medium body of the filter element is relieved of forces so that also the risk of damage is reduced and the service life of the filter element is increased.

A further advantage resides in the stabilization of the filter medium body by means of the at least one adhesive bead. The latter comprises in particular a higher strength than the filter material of the filter medium body. Also, the structure of the filter medium body, in particular in the embodiment as a folded filter, can be stabilized by the adhesive bead.

According to an advantageous embodiment, the adhesive bead, at least at one side, for example, at the inflow side, is in direct contact with the sealing or supporting element arranged thereat so that the force transmission is improved. In addition, an improved seal-tightness is provided because leakage flows at the transition between the sealing or supporting element is excluded by the adhesive bead. In an alternative embodiment, it is also possible that a further component is positioned between the sealing or supporting element and the adhesive bead by means of which the force transmission from sealing or supporting element to the adhesive bead is realized.

In a further expedient embodiment, at least one sealing or supporting element is embodied so as to extend circumferentially about the filter element. In case of a parallelepipedal filter element, for example, the sealing or supporting element is accordingly embodied of a rectangular shape. In an alternative embodiment, the sealing or supporting element does not extend circumferentially but extends along the corresponding inflow side or outflow side only across a partial region along the outer circumference of the filter medium body. In this case, the sealing or supporting element is also positioned however in axial extension of the adhesive bead in order to enable the desired force transmission between the sealing or supporting element and the adhesive bead. The sealing or supporting elements at the inflow side and at the outflow side can each be embodied to extend circumferentially or each embodied to not extend circumferentially or to extend only at one side circumferentially and to not extend circumferentially at the opposite side.

The sealing or supporting element in the embodiment as a sealing element also exerts a supporting function. In addition, a sealing action is provided in particular relative to the adjoining housing walls of the receiving filter element. In case of a support element, the sealing function plays no or only a subordinate role. In this case, a support action of the filter element relative to the filter housing or the housing cover however occurs also and, correspondingly, a force transmission to the adhesive bead at the filter medium body. Advantageously, the element is embodied at the inflow side as a sealing element in order to separate the raw side from the clean side while the element at the outflow side is selectively embodied as a sealing element or only as a supporting element.

The sealing or supporting elements at the inflow side and the outflow side are connected fixedly with the filter medium body. This is realized, for example, in that, when manufacturing the filter element, the sealing or supporting element is cast, foamed or injection molded from a material that can be cast or injection molded, for example, PUR (polyurethane), to the rim area of the filter medium body. In this context, it is preferred that the sealing or supporting element is in direct, friction-fit, preferably form-fit, further preferred seal-tight contact with the adhesive bead. The seal-tight contact is in particular advantageous between sealing element and an adhesive bead which is applied to a zigzag-shaped folded filter medium body because in this way a simple complete sealing action between inflow side and outflow side can be achieved since the adhesive bead is also preferably applied continuously such that it separates the raw side from the clean side at the end face or preferably at both end faces. This means that the sealing or supporting elements each preferably enclose seal-tightly a respective adhesive bead facing the sealing or supporting element.

According to yet another advantageous embodiment, at least one sealing or supporting element projects past the outer side of the filter medium body. This makes it possible to use the projecting section for the connection to the filter housing or to the housing cover and/or for receiving a seal, for example, in a groove, that is provided in the sealing or supporting element in the region of the projecting section. The groove in the sealing or supporting element can serve also for receiving a housing-associated or cover-associated projection.

According to a further expedient embodiment, at oppositely positioned outer sides or adjacent to each oppositely positioned outer side of the filter medium body, an adhesive bead is arranged, respectively, which extends between the sealing or supporting elements at the inflow side and the outflow side. In this way, a uniform force transmission at oppositely positioned outer sides of the filter medium body is ensured that are positioned angularly relative to the inflow side and the outflow side, in particular at a right angle.

The adhesive bead is preferably applied immediately to the filter material of the filter medium body and is fixedly connected by adhesive connection with the filter medium body.

According to yet another expedient embodiment, the filter medium body is embodied as a folded filter whose fold tips are lying on the inflow side and the outflow side. Accordingly, the end face edges of the folds extend zigzag-shaped at an angle of preferably approximately 90°, respectively, relative to the inflow side and outflow side of the filter medium body. The adhesive bead fills, advantageously uninterrupted, several intermediate fold spaces along the end face edges and extends correspondingly across or along a plurality of end face edges of the folded filter, in particular across or along all end face edges of the folded filter, in particular at both longitudinal sides of the folded filter, preferably at the outflow side or preferably at the side which is facing the sealing element, and further preferred additionally or alternatively at the inflow side, i.e., preferably additionally or alternatively at the side which is facing away from the sealing element and is facing the supporting element. The adhesive bead fills the intermediate fold spaces preferably such that a continuous adhesive extension, which is pressure-resistant in flow direction between inflow side and outflow side after curing, is generated between inflow side and outflow side or between fold tip and fold base, respectively. In this embodiment, the adhesive bead forms an end face edge adhesive connection so that in addition to the force transmission between the sealing or supporting elements at the inflow side or outflow side also a stabilization of the folds is achieved. An introduction of the end face edge adhesive connection exclusively into the intermediate fold spaces facing the inflow side is conceivable as well as an introduction of the end face edge adhesive connection into the intermediate fold spaces facing the inflow side as well as the outflow side, as well as an introduction of the end face edge adhesive connection exclusively into the intermediate fold spaces at the outflow side. The adhesive bead in this context is arranged at the flat side of the filter medium preferably slightly spaced apart relative to the end face edges. It is understood that an adhesive bead upon application initially represents a rope-like applied adhesive trace. Pre-shaped adhesive bodies or plate-shaped plastic or adhesive structures are no adhesive beads.

Since the adhesive bead is preferably applied continuously along the end face edge of the filter medium prior to erecting the folds, the adhesive bead extends preferably respectively also across and past the fold tips so that, after erection of the folds and hardening of the adhesive bead(s), a comb-like structure is formed which seal-tightly closes off the intermediate fold spaces relative to the end faces. An advantage of the present invention in a preferred embodiment is that the merlons of the comb-like structure or comb-like structures formed in this way in their extension direction can transmit axial forces which result from the installation situation of the filter element, wherein for the force transmission it is not required that the merlons are connected to each other by means of the part of an adhesive bead projecting past the fold tips. The advantage can thus be achieved also by an interruption at this location. Important for a particularly preferred embodiment is that the merlons or adhesive beads extend continuously from the inflow side to the outflow side.

In an alternative embodiment, the filter medium body is configured as a block filter without filter folds. In this case also, at or adjacent to the outer side of the filter medium body, one or a plurality of adhesive beads extend between the sealing or supporting elements at the inflow side and the outflow side.

According to an expedient embodiment, either the inflow side or the outflow side is positioned in a plane while the oppositely positioned side comprises at least two sections with different spacing to the inflow side or outflow side positioned in a plane. Correspondingly, the filter medium body comprises a flat-surface side which forms either the inflow side or the outflow side and, opposite thereto, a side with different sections which correspondingly forms either the outflow side or the inflow side. For example, the inflow side is positioned in a plane and the outflow side comprises at least two sections with different spacing to the inflow side. In this embodiment, the filter element can be adapted in particular to different installation situations in the filter housing in an optimal way. For example, cutouts at one side of the filter medium body can be provided, for example, with part circular cross-section surface in order to adapt the inflow side or the outflow side, for example, to the shape of a tube through which the fluid is supplied or discharged.

BRIEF DESCRIPTION OF THE DRAWINGS

Further advantages and expedient embodiments are found in the additional claims, the figure description, and the drawings.

In the Figures, same components use the same reference characters.

DESCRIPTION OF PREFERRED EMBODIMENTS

Figure 1:
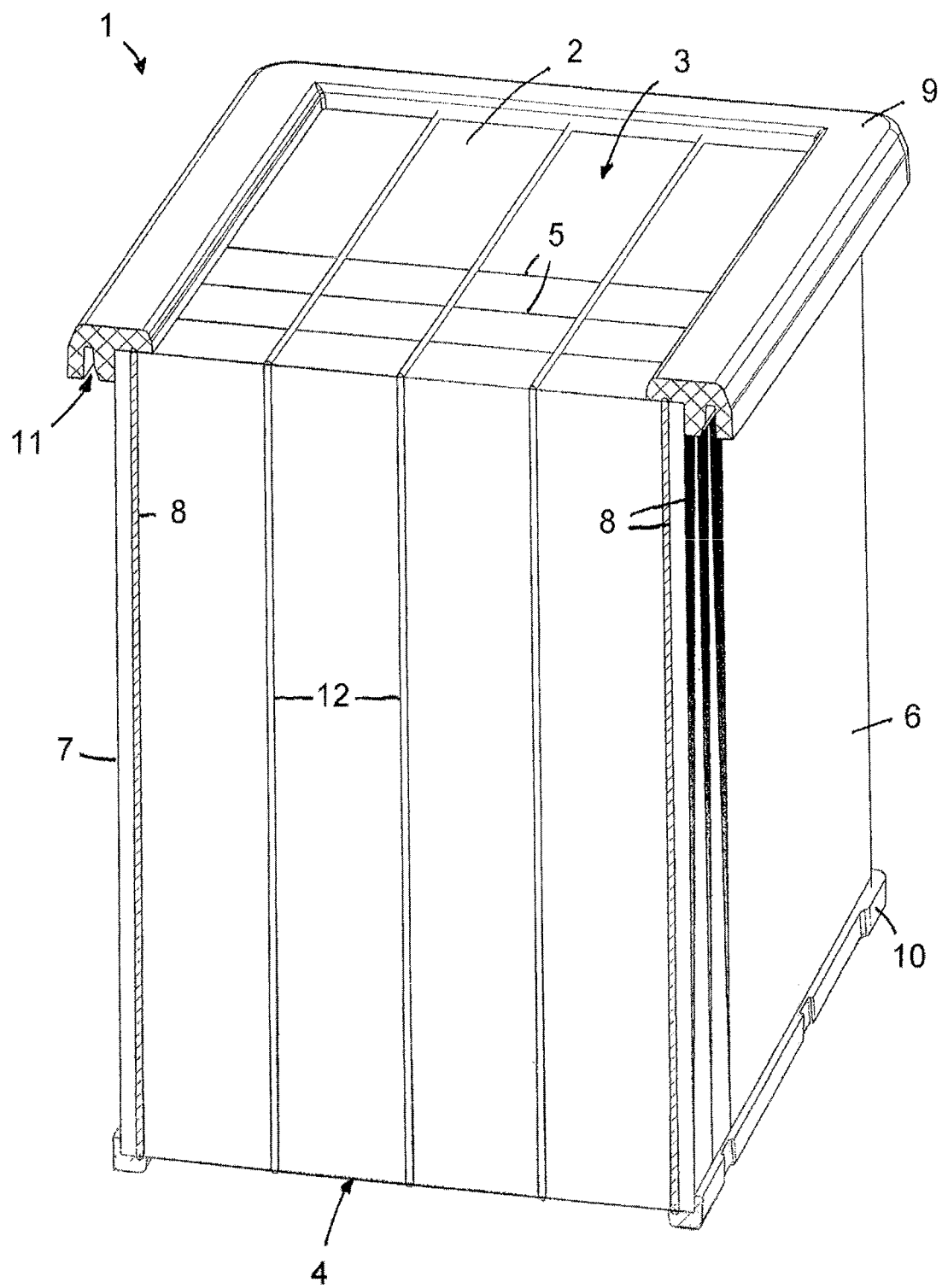
FIG. 1 shows in perspective view a filter element with a filter medium body embodied as a folded filter which at the inflow side as well as at the outflow side comprises a sealing or supporting element, respectively, wherein at the outer side of the filter medium body adhesive beads are introduced into the filter folds which extend between the oppositely positioned sealing or supporting elements.

In FIG. 1, a filter element 1 is illustrated that, for example, can be used for air filtration of combustion air to be supplied to an internal combustion engine in a vehicle such as, for example, a truck. The filter element 1 comprises a filter medium body 2 of a filter material at which the filtration takes place. The flow through the filter element 1 is realized via the inflow side 3 at the top, in accordance with the illustration of FIG. 1, in direction of the outflow side 4 at the bottom.

The filter medium body 2 is designed as a folded filter and comprises a plurality of filter folds whose fold tips 5 are lying at the inflow side 3 and at the oppositely positioned outflow side 4 and whose end face edges are facing the lateral outer sides 6 and 7 of the filter medium body. Adjacent to the lateral outer sides 6, 7, adhesive beads 8 are arranged at the filter medium body 2 which fill the filter folds that are open toward the inflow side 3. The lateral adhesive beads 8 close off the filter folds at the outer sides 6 and 7 and ensure an axial flow through the filter medium body 2 from the inflow side 3 to the outflow side 4. Moreover, the adhesive beads 8 stabilize the folds of the filter medium body.

At the inflow side 3, there is a first sealing or supporting element 9 that is embodied to extend circumferentially and is arranged in the rim area so that the entire inflow side 3 positioned in a plane is framed by the sealing or supporting element 9. At the oppositely positioned outflow side 4 there is also a sealing or supporting element 10 that also is arranged in the rim area and is embodied to extend circumferentially. The two sealing or supporting elements 9, 10 extend each in the rim area at the inflow side 3 or outflow side 4 and cover the respective end face edge of each adhesive bead 8. In this way, an axial force transmission between inflow side and outflow side 3, 4 between the sealing or supporting elements 9, 10 through the laterally extending adhesive beads 8 is ensured. In particular in the installed position in the receiving filter housing and with attached housing cover which loads the filter element 1 with pressure, absorption of the holding forces through the oppositely positioned sealing or supporting elements 9, 10 and the intermediately positioned adhesive beads 8 is ensured so that the filter material of the filter medium body 2 is relieved of these holding forces.

Advantageously, the sealing or supporting elements 9, 10 are applied immediately to the filter medium body 2, for example, by casting or injection molding. The sealing or supporting elements 9, 10 are comprised, for example, of PUR material. Both sealing or supporting elements 9, 10 are positioned in immediate contact with the respective end face edges of the adhesive beads 8 and extend also to the outer sides 6 and 7 against which the adhesive beads 8 are resting as well as the forwardly and rearwardly positioned outer sides of the filter medium body 2 which, as a whole, is of a parallelepipedal shape. The inflow side 3 as well as the outflow side 4 are each embodied planar or areal; inflow side and outflow side are lying parallel to each other.

In the sealing or supporting element 9 positioned at the inflow side 3 a circumferentially extending receiving groove 11 for a seal is provided. The receiving groove 11 is located in a section of the sealing or supporting element 9 which is projecting laterally past the outer sides of the filter medium body 2. The receiving groove 11 is embodied open in the direction of the oppositely positioned outflow side 4.

Between the outwardly positioned adhesive beads 8 additional adhesive beads 12 are provided at the filter medium body 2 which extend parallel to the outwardly positioned adhesive beads 8 forming an end face edge adhesive connection and which divide the filter folds of the filter medium body 2 into chambers. The adhesive beads 12 can be embodied continuous or optionally can be embodied interrupted.

Instead of a seal, a projection of the receiving filter housing can also project into the receiving groove 11 at the sealing or supporting element 10.

Figure 2:
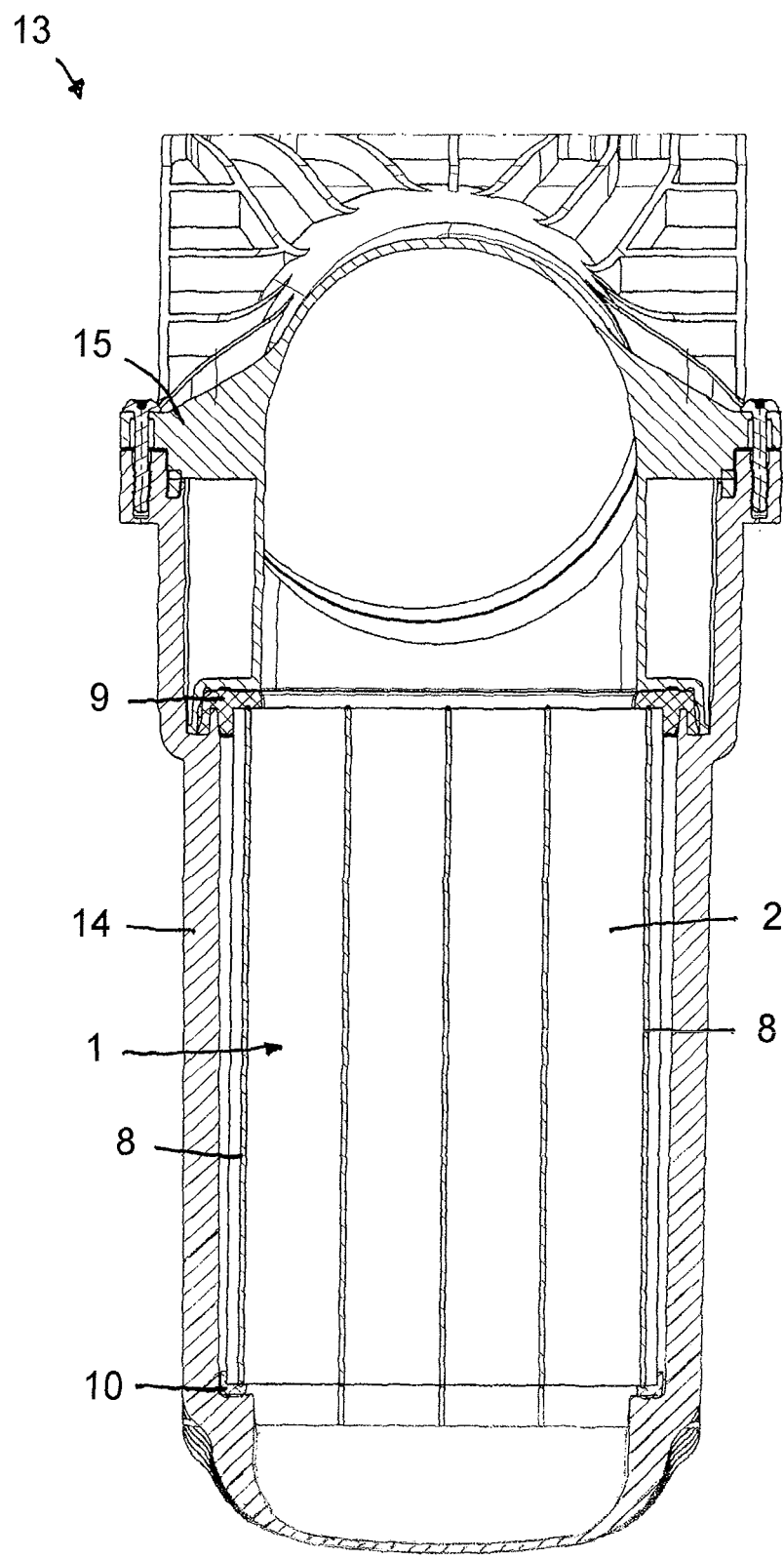
FIG. 2 shows a filter device with a filter housing and a housing cover, wherein in the filter housing a filter element according to FIG. 1 is received.

In FIG. 2, a filter device 13 with a filter housing 14 and the filter element 1 received in the filter housing 14 is illustrated. The filter housing 14 is closed by a housing cover 15 wherein a sealing element is arranged for sealing between filter housing 14 and housing cover 15. The filter element 1 is supported with its lower sealing or supporting element 10 at the bottom of the receiving filter housing 14 while the oppositely positioned upper sealing or supporting element 9 is force-loaded by the housing cover 15. The holding force which is exerted thereby is transmitted through the upper sealing or supporting element 9 and the adhesive beads 8 into the lower sealing or supporting element 10 and farther into the receiving filter housing 14.

Figure 3:
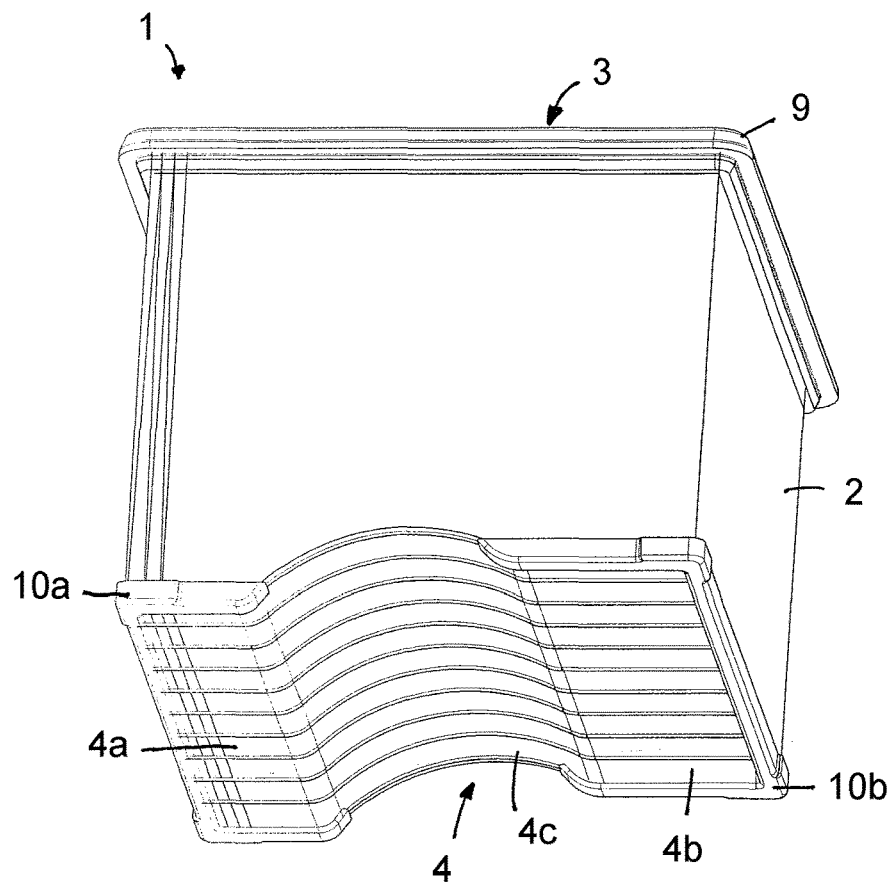
FIG. 3 shows a filter element in an alternative embodiment in which the outflow side is comprised of two planes parallel to the inflow side, but at different spacing, and an intermediately positioned part-circular curved section.
Figure 4:
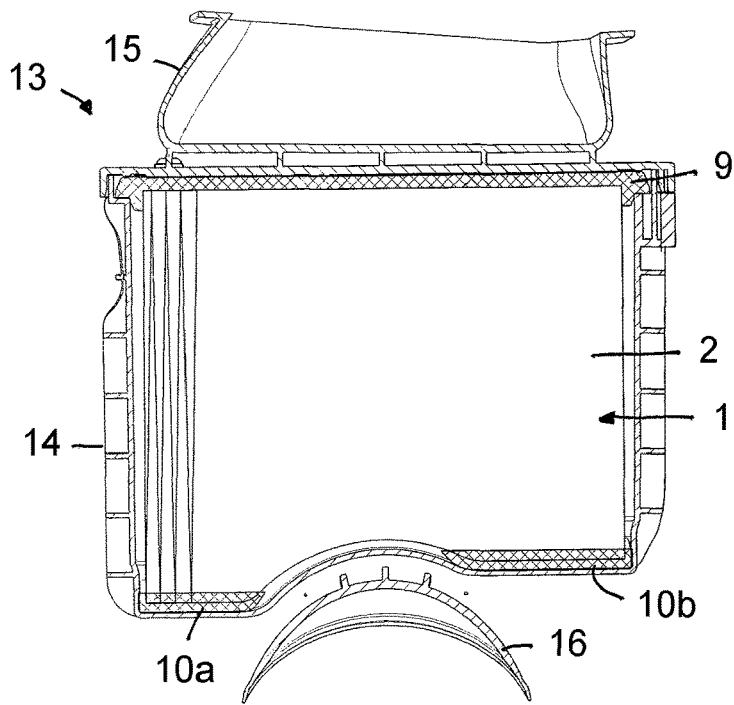
FIG. 4 shows a filter device with the filter element according to FIG. 3 in section view.

FIG. 3 shows the filter element 1 in an embodiment variant in which the outflow side 4 of the filter medium body 2 is different in comparison to the embodiment according to FIG. 1. In FIG. 3, the filter medium body 2 is also embodied as a folded filter and adhesive beads that form an end face edge adhesive connection extend at the outer sides between the sealing or supporting element 9 at the inflow side 3 and the sealing or supporting element 10a, 10b at the outflow side 4. The inflow side 3 is embodied planar, the outflow side 4, on the other hand, comprises two outwardly positioned planar sections 4a and 4b and an intermediately positioned, inwardly curved section 4c. The two outwardly positioned sections 4a, 4b are positioned at different levels and thus have a different spacing to the inflow side 3 relative to which the outwardly positioned outflow side sections 4a, 4b extend parallel. The central curved section 4c is in particular of a part-circular shape and serves to receive a housing-associated outflow tube 16, as shown in particular in FIG. 4. This makes it possible, as illustrated in FIG. 4, to fill the receiving space in the filter housing 14 in an optimal way so that no housing-associated unused empty spaces are generated. Due to the curvature, the spacing relative to the oppositely positioned inflow side 3 changes within the central section 4c of the outflow side 4 as a function of the actual position between the outwardly positioned planar sections 4a and 4b.

At the outflow side, the sealing or supporting element is of a two-part configuration with a first part 10a at the outflow side section 4a and a second part 10b at the outflow side section 4b. Each part 10a, 10b is embodied U-shaped and frames the sections 4a, 4b at the three outwardly positioned sides. There is however no sealing or supporting element at the transition between the outwardly positioned sections 4a and 4b along the central section 4c that is embodied curved.

The adhesive beads at the outer side extend between the upper sealing or supporting element 9 and the two lower outflow side sealing or supporting elements 10a and 10b. In this way, despite the multi-part configuration of the outflow side sealing or supporting element, a force transmission between inflow side and outflow side through the adhesive beads positioned at the outer sides is ensured.

Figure 5:
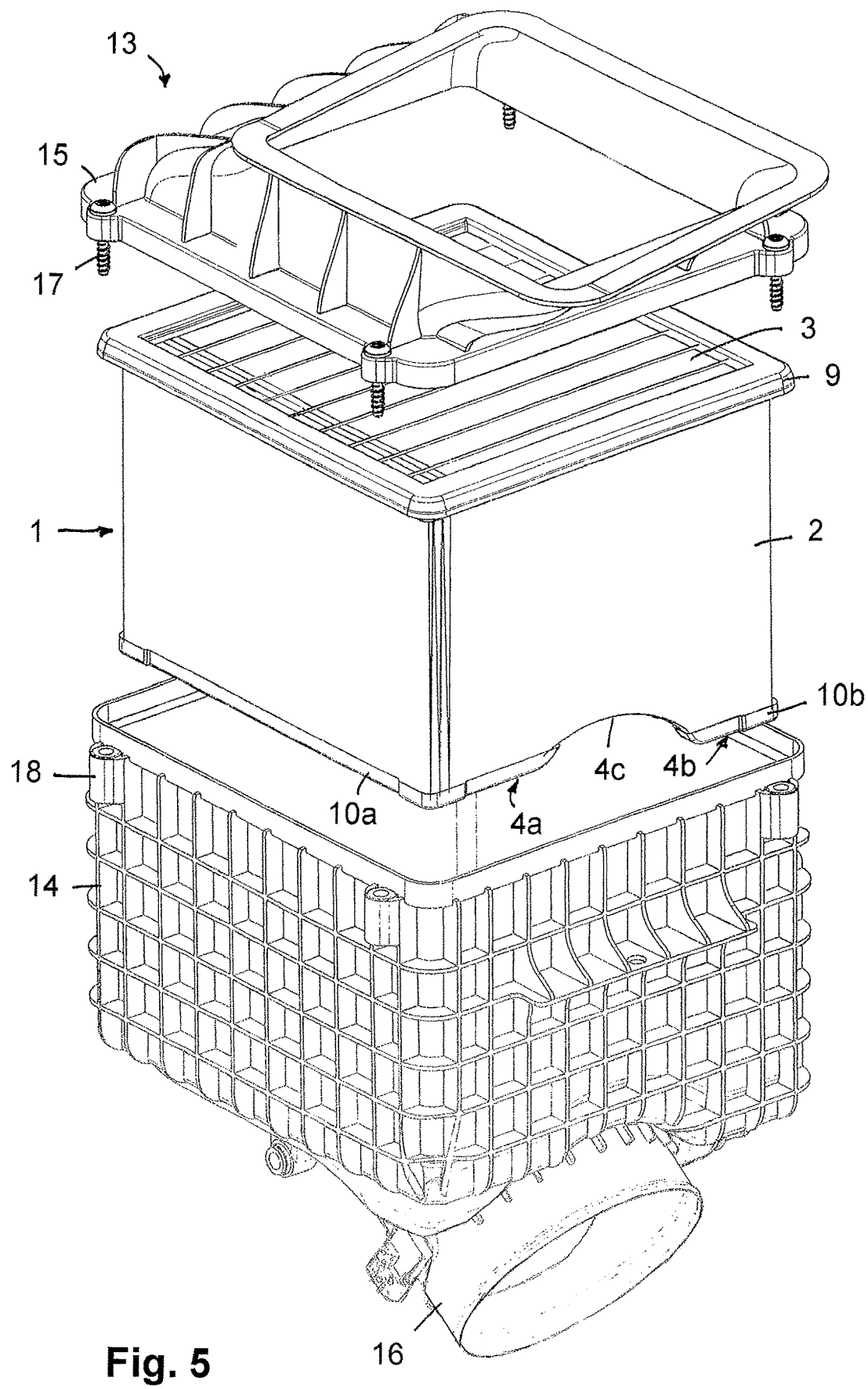
FIG. 5 shows a filter device with the different components in exploded illustration.

In FIG. 5, a filter device 1 with its components is shown in exploded illustration. The filter device 13 corresponds to that of FIG. 4 and comprises a filter element 1 according to FIG. 3 with a planar inflow side 3 and an outflow side 4 with planar but height-displaced sections 4a and 4b and an intermediately positioned curved section 4c. The housing cover 15 is screwed by screws 17 to the filter housing 14 which for this purpose comprises housing eyes 18 into which the screws 17 are screwed.

Figure 6:
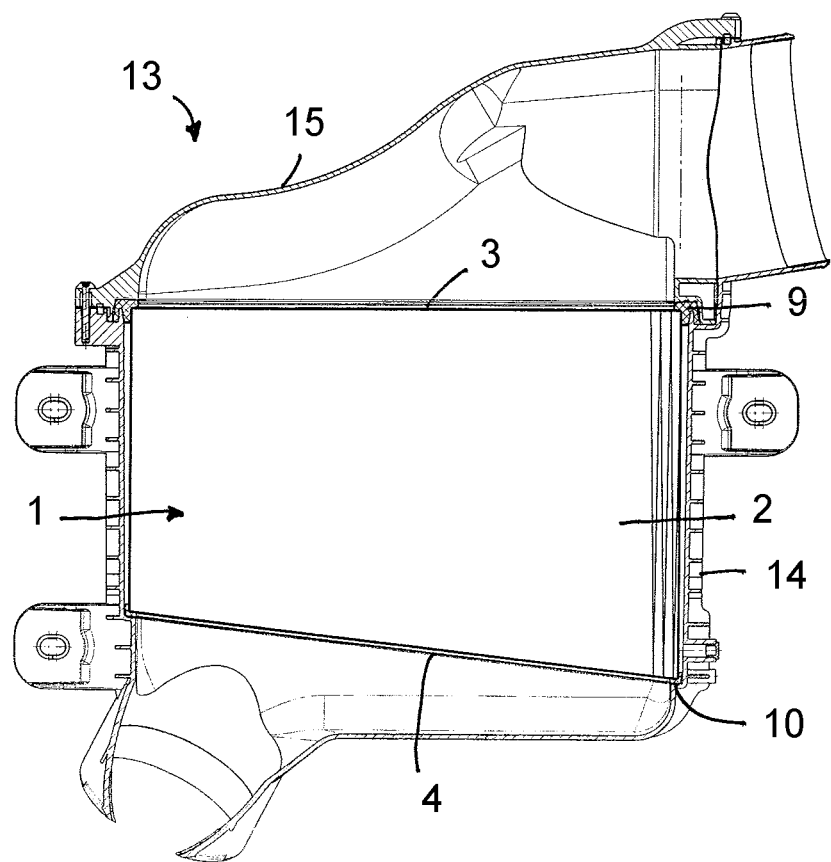
FIG. 6 shows a filter device with a filter element in a further embodiment variant in which the inflow side and outflow side each are embodied flat-surfaced but are oriented at an angle relative to each other.

In FIG. 6, a further embodiment with a filter element 1 inserted into a filter housing 14 is illustrated that comprises two flat-surface inflow and outflow sides 3, 4, planar as such, which however are positioned angularly relative to each other. The inflow side 3 is positioned, relative to the insertion direction into the filter housing 14, orthogonally to the filter housing while the outflow side 4 is extending at an angle deviating from 90° relative to the insertion direction. The filter medium body 2 of the filter element 1 is embodied as a folded filter which, in the upper and lower rim areas, is framed respectively by a sealing or supporting element 9 or 10 wherein holding forces between the housing cover 15 and the filter housing 14 are transmitted by lateral adhesive beads. FIG. 6 also shows an inflow tube for supply of raw air in the housing cover 15 and an outflow tube for discharging purified air at the bottom of the filter housing 14.

Figure 7:
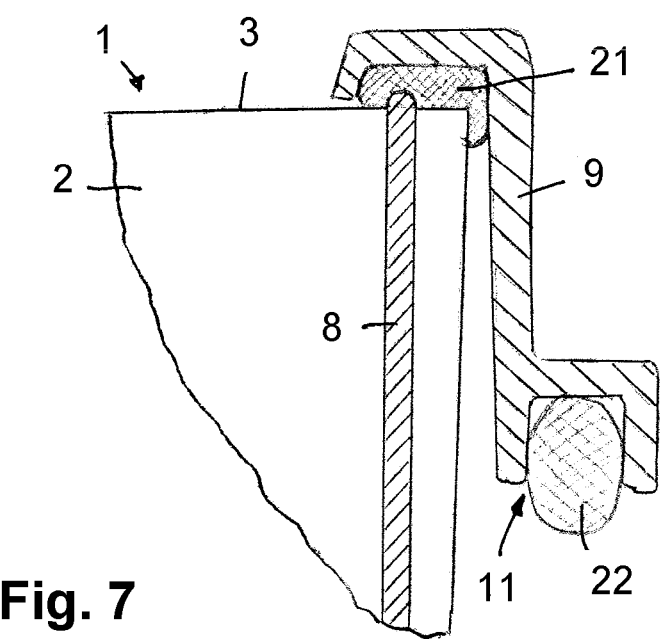
FIG. 7 shows a section through the lateral area of a filter element of a further embodiment.

In the embodiment according to FIG. 7, the sealing or supporting element 9 at the inflow side 3 of the filter medium body 2 is not in direct contact with the end face edge of the adhesive bead 8. Instead, a seal 21 is provided between the end face edge of the adhesive bead 8 and the sealing or supporting element 9 and extends across the rim area of the filter medium body 2 and is in immediate contact with the adhesive bead 8. The sealing or supporting element 9 engages across the seal 21 so that holding forces acting on the sealing or supporting element 9 are transmitted through the seal 21 to the adhesive bead 8.

FIG. 7 also shows that the part of the sealing or supporting element 9 projecting past the outer side of the filter medium body 2 comprises the receiving groove 11 into which a further seal 22 is inserted. In the mounted state, the seal 22 is resting against a shoulder in the filter housing.

What is claimed is:

1. A filter element comprising:
    a filter medium body comprising
        a first side and
        an oppositely positioned second side,
        wherein one of the first and second sides is the inflow side of the filter medium body and
        the other one of the first and second sides is the outflow side of the filter medium body;
        wherein an axial direction, as used herein, is a direction from the first side to the second side of the filter medium body;
        wherein the filter medium body has at least one lateral side which extends from the first side to the second side of the filter medium body; and
        wherein a rim edge is formed by the filter medium body where the first side or the second side meet the at least one lateral side;
    a first sealing or supporting element arranged at the first side;
    a second sealing or supporting element arranged at the second side;
    at least one force-transmitting adhesive bead extending axially on the at least one lateral side from the first sealing or supporting element to the second sealing or supporting element,
    wherein the sealing or supporting elements are in immediate contact with respective axial ends of the at least one force-transmitting adhesive bead, such that axial forces are transmitted through the at least one force-transmitting adhesive bead from the first sealing or supporting element to the second sealing or supporting element, bypassing axial forces around filter medium of the filter medium body,
    wherein the first side is positioned in a plane and the second side comprises at least a first section and a second section,
    wherein the first section has a first spacing relative to the first side and
    the second section has a second spacing relative to the first side,
    wherein the first and second spacings are different.

2. The filter element according to claim 1, wherein the at least one force-transmitting adhesive bead is in direct contact with the first and second sealing or supporting elements.

3. The filter element according to claim 1, wherein at least one of the first and second sealing or supporting elements extends circumferentially around the first side or the second side, respectively.

4. The filter element according to claim 1, wherein at least one of the first and second sealing or supporting elements projects radially outwardly past an outer side of the filter medium body.

5. The filter element according to claim 1, wherein the at least one lateral side of the filter medium body comprises a first outer side and a second outer side positioned opposite the first outer side, wherein the at least one force-transmitting adhesive bead includes a first adhesive bead and a second adhesive bead spaced apart from the first adhesive bead, wherein the first adhesive bead is arranged at the first outer side between the first and second sealing or supporting elements, and wherein the second adhesive bead is arranged at the second outer side between the first and second sealing or supporting elements.

6. The filter element according to claim 1, wherein the at least one lateral side of the filter medium body further comprises a third outer side, the third outer side arranged between the first and second outer sides, at least one additional force-transmitting adhesive bead disposed on or in the filter medium body and arranged at a spacing relative to the at least one force-transmitting adhesive bead, the at least one additional force-transmitting adhesive bead extending axially and in immediate contact with the first sealing or supporting element to the second sealing or supporting element to bypass axial forces around the filter medium of the filter medium body through the at least one additional force-transmitting adhesive bead.

7. The filter element according to claim 1, wherein the filter medium body is a folded filter.

8. The filter element according to claim 7, wherein the at least one force-transmitting adhesive bead forms an end face edge adhesive connection extending across a plurality of end face edges of folds of the folded filter.

9. The filter element according to claim 7, wherein the at least one force-transmitting adhesive bead seals laterally at least one fold of the folded filter.

10. The filter element according to claim 1, wherein the at least one force-transmitting adhesive bead and at least one of the first and second sealing or supporting elements are lying in axial alignment.

11. The filter element according to claim 1, wherein at least one of the first and second sealing or supporting elements is comprised of PUR (polyurethane) material.

12. The filter element according to claim 1, wherein at least one the first and second sealing or supporting elements is applied immediately onto the filter medium body.

13. The filter element according to claim 1, wherein at least one of the first and second sealing or supporting elements engages about at least one edge of the filter medium body.

14. The filter element according to claim 1, wherein at least one of the first and second sealing or supporting elements is strip-shaped.

15. A filter device comprising:
a filter element comprising:
a filter medium body comprising
a first side and
an oppositely positioned second side,
wherein one of the first and second sides is the inflow side of the filter medium body and
the other one of the first and second sides is the outflow side of the filter medium body;
wherein an axial direction, as used herein, is a direction from the first side to the second side of the filter medium body;
wherein the filter medium body has at least one lateral side which extends from the first side to the second side of the filter medium body; and
wherein a rim edge is formed by the filter medium body where the first side or the second side meet the at least one lateral side;
a first sealing or supporting element arranged at the first side;
a second sealing or supporting element arranged at the second side;
at least one force-transmitting adhesive bead extending axially on the at least one lateral side from the first sealing or supporting element to the second sealing or supporting element,
wherein the sealing or supporting elements are in immediate contact with respective axial ends of the at least one force-transmitting adhesive bead, such that axial forces are transmitted through the at least one force-transmitting adhesive bead from the first sealing or supporting element to the second sealing or supporting element, bypassing axial forces around filter medium of the filter medium body,
wherein the at least one adhesive bead forms a force transmitting element transmitting forces between the first and second sealing or supporting elements;
wherein the first side is positioned in a plane and the second side comprises at least a first section and a second section,
wherein the first section has a first spacing relative to the first side and the second section has a second spacing relative to the first side,
wherein the first and second spacings are different;
a filter housing receiving the filter element.

16. The filter device according to claim 15, further comprising
a housing cover,
wherein the first sealing or supporting element of the filter element is supported at the filter housing, and
wherein the second sealing or supporting element of the filter element is supported at the housing cover.

* * * * *